US006477667B1

(12) United States Patent
Levi et al.

(10) Patent No.: US 6,477,667 B1
(45) Date of Patent: Nov. 5, 2002

(54) METHOD AND SYSTEM FOR REMOTE DEVICE MONITORING

(75) Inventors: Andrew E. Levi, Plano; Bradley W. Bauer, Richardson; Robert C. Woldberg, Richardson, all of TX (US)

(73) Assignee: Critical Devices, Inc., Carrollton, TX (US)

( * ) Notice: Subject to any disclaimer, the term of this patent is extended or adjusted under 35 U.S.C. 154(b) by 0 days.

(21) Appl. No.: 09/415,191

(22) Filed: Oct. 7, 1999

(51) Int. Cl.[7] .............................................. G06F 11/00
(52) U.S. Cl. .................................... 714/57; 714/48
(58) Field of Search .................................. 714/48, 57

(56) References Cited

U.S. PATENT DOCUMENTS

| | | | |
|---|---|---|---|
| 4,545,011 A | 10/1985 | Lyon et al. | 364/200 |
| 4,800,384 A | 1/1989 | Snijders | 340/825.52 |
| 4,956,863 A | 9/1990 | Goss | 380/30 |
| 5,343,529 A | 8/1994 | Goldfine et al. | 380/23 |
| 5,598,528 A | 1/1997 | Larson et al. | 395/182.05 |
| 5,731,785 A | 3/1998 | Lemelson et al. | 342/357 |
| 5,740,357 A * | 4/1998 | Gardiner | 714/57 |
| 5,748,084 A | 5/1998 | Isikoff | 340/568 |
| 5,751,936 A | 5/1998 | Larson et al. | 395/182.05 |
| 5,751,964 A | 5/1998 | Ordanic et al. | 395/200.54 |
| 5,768,501 A | 6/1998 | Lewis | 395/185.01 |
| 5,790,548 A | 8/1998 | Sistanizadeh et al. | 370/401 |
| 5,796,633 A * | 8/1998 | Burgess | 702/187 |
| 5,802,280 A | 9/1998 | Cotichini et al. | 395/200.3 |
| 5,812,819 A | 9/1998 | Rodwin et al. | 395/500 |
| 5,928,328 A | 7/1999 | Komori et al. | 709/223 |
| 5,936,526 A | 8/1999 | Klein | 340/571 |
| 5,963,131 A | 10/1999 | D'Angelo et al. | 340/568.1 |
| 6,125,390 A * | 9/2000 | Touboul | 709/223 |
| 6,145,098 A * | 11/2000 | Nouri | 714/31 |
| 6,219,648 B1 * | 4/2001 | Jones | 705/8 |
| 6,237,114 B1 * | 5/2001 | Wookey | 714/47 |

FOREIGN PATENT DOCUMENTS

| | | | |
|---|---|---|---|
| EP | 0 869 640 A1 | 10/1978 | H04L/12/28 |
| EP | 0 740 037 A1 | 4/1995 | E05B/49/00 |
| EP | 0 822 498 A1 | 2/1998 | G06F/11/30 |
| EP | 0 899 648 A2 | 8/1998 | G06F/1/00 |
| EP | 0 951 155 A1 | 10/1999 | H04L/12/24 |
| WO | WO 93/01550 | 1/1993 | G06F/11/34 |
| WO | WO 96/03728 | 2/1996 | G08B/25/01 |
| WO | WO 98/04967 | 2/1998 | G06F/1/00 |
| WO | WO 98/21658 | 5/1998 | G06F/11/22 |
| WO | WO 98/43151 | 10/1998 | G06F/1/00 |
| WO | WO 99/08420 | 2/1999 | H04L/12/24 |

OTHER PUBLICATIONS

"LAN Trace Facility for OS/2 LAN Server and DOS LAN Requester" IBM Techinical Disclosure Bulletin 1993, vol. 36, issue 9B, pp. 267–268.*

XP–000799765: Author: Rajiv Shukla, et al., "Toss: Tonics for Operation Support Systems System Management using the World Wide Web and intelligent software agents", IEEE, pp.100–109, Nov. 3, 1997.

(List continued on next page.)

*Primary Examiner*—Scott Baderman
*Assistant Examiner*—Bryce P. Bonzo
(74) *Attorney, Agent, or Firm*—Baker Botts L.L.P.

(57) ABSTRACT

A user contracts for service with an operations center (12) in order to provide monitoring services for a plurality of devices (30). After contracting for service, the operations center provides an agent (81) for download by a user to one or more of the user's devices (14, 16, 18, 20, 22) for which the user has contracted for service. The agent is installed on the devices associated with the user's sites and a listener (362) at the operations center listens for alerts generated as a result of the agent monitoring health-indicative operating parameters on the device. After an alert is received by the operations center, a contact (32) is notified of the alert so that the problem causing the generation of the alert may be corrected.

31 Claims, 9 Drawing Sheets

OTHER PUBLICATIONS

XP 000043286: Author: IBM Corporation, New York, "Automated Problem Reporting", IBM Technical Disclosure Bulletin, vol. 32, No. 6A, pp. 466–468, Nov. 1989.

Author: Andrew E. Levi, "Method and System for Providing Technical Support with User Approval", specification (45 pages) and drawings (9 pages) (066782.0103), Oct. 7, 1999.

XP 000496023: Author: Mary Jander, "LAN Analysis: The View From Layer 7", 8178 Data Communications, No. 3, pp. 47–48, Mar. 24, 1995.

Author: Andrew E. Levi, "Method and System for Providing Technical Support with User Approval", specification (45 pages) and drawings (9 pages) (066782.0103), Oct. 7, 1999.

XP-002155308: Author: Christopher Nolan, "A Look at e-Test Suite 3.1 by RSW", Software Testing & Quality Engineering Magazine, (2 pages), Jul. & Aug. 1999.

XP-002161813: Author: Kevin Reichard, "Scoping Out Web Performance", UNIX Review's Performance Computing (3 pages), Jun. 1999.

XP-002161814: Author: Avesta Technologies, "Avesta Technologies (R) Unveils Web Site Performance, Availability and Integrity Monitoring Solution", ScreamingMedia, PR Newswire (2 pages). Aug. 2, 1999.

* cited by examiner

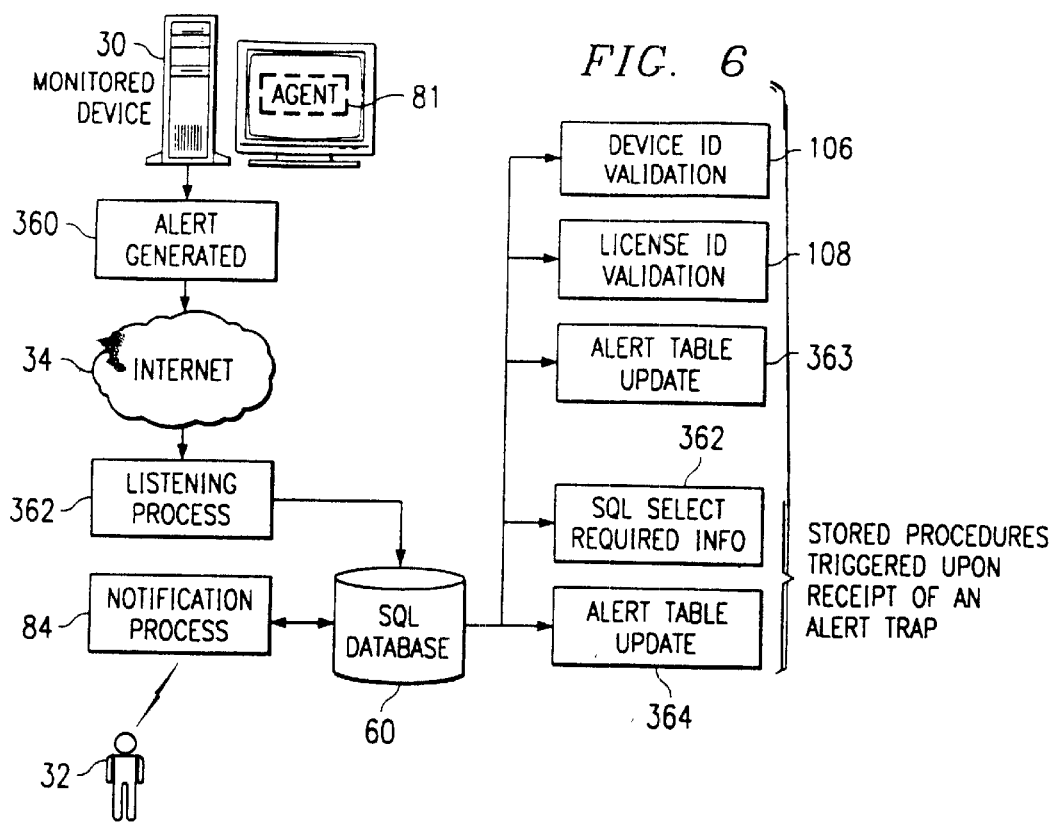
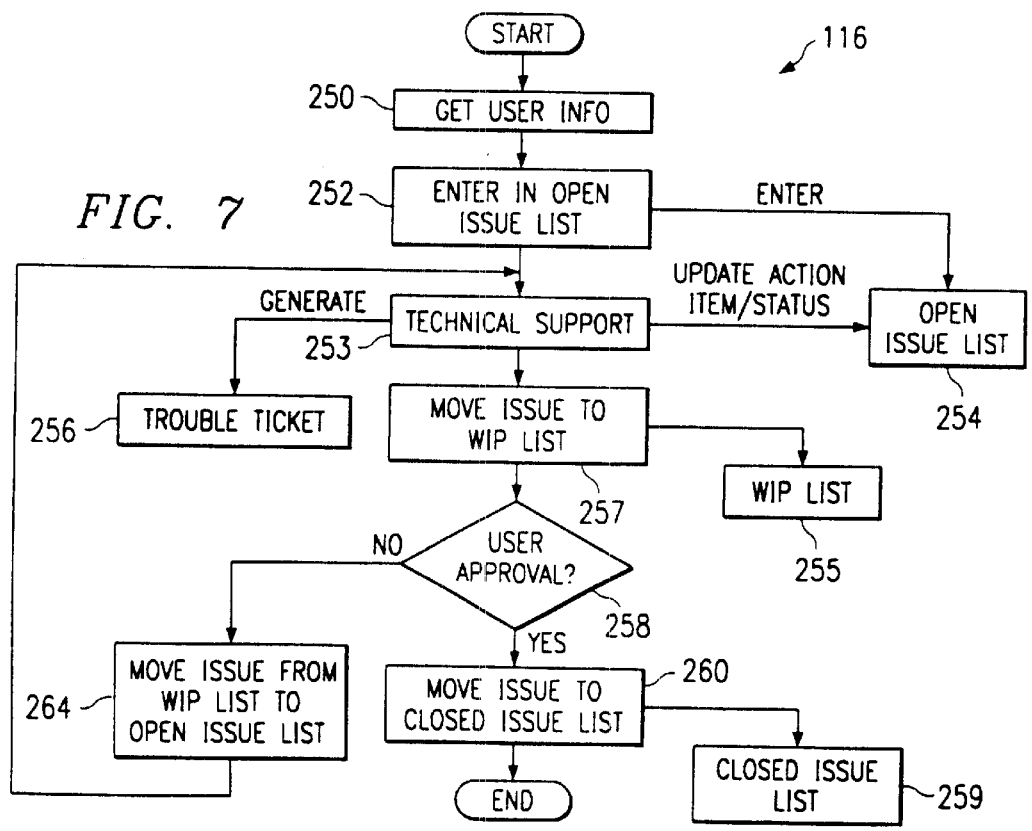

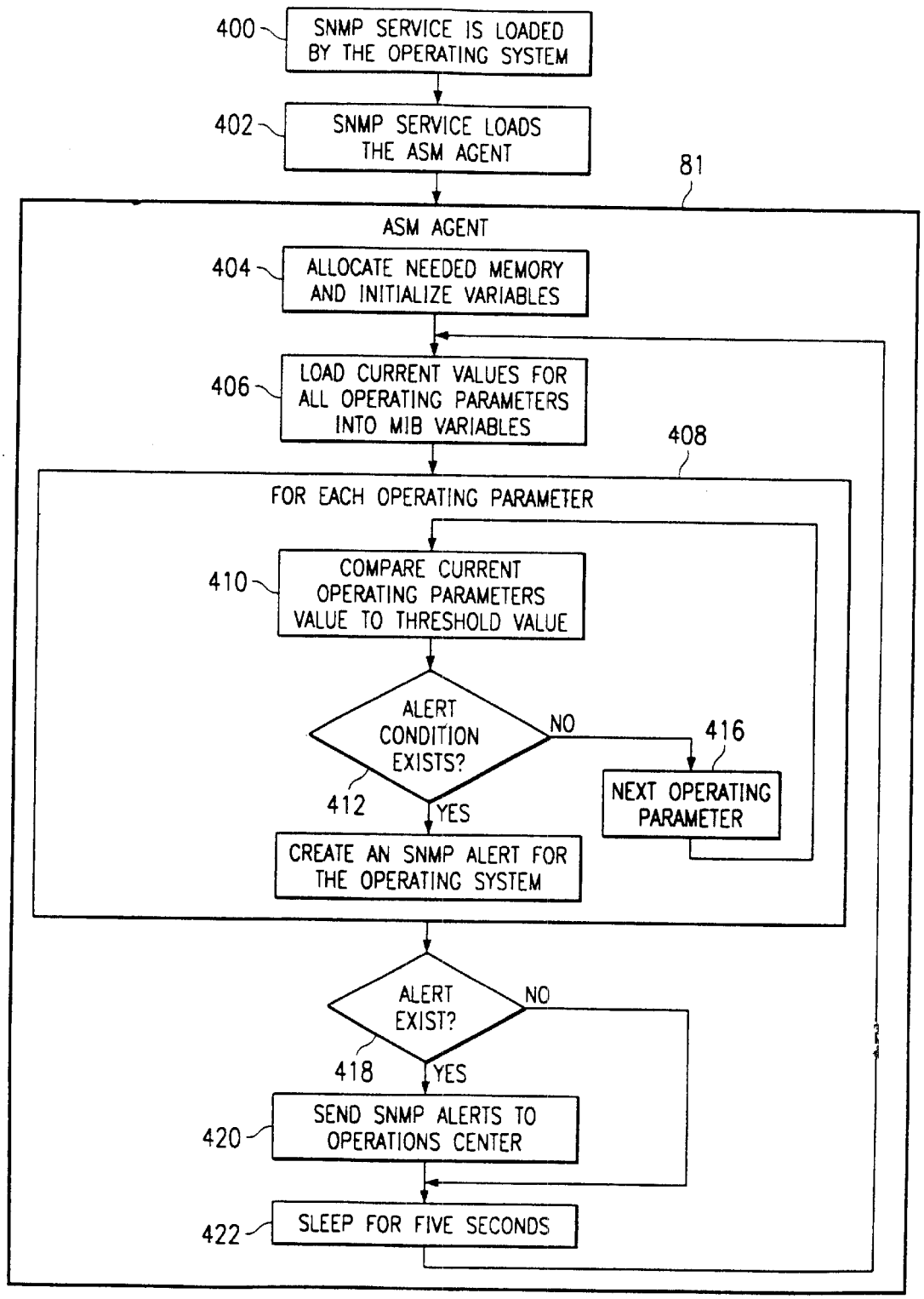

METHOD AND SYSTEM FOR REMOTE DEVICE MONITORING

RELATED APPLICATIONS

This patent application is related to co-pending U.S. application Ser. No. 09/415,044 entitled "Method and System for Providing Technical Support with User Approval", filed Oct. 7, 1999.

BACKGROUND OF THE INVENTION

As computer systems and networks have grown in complexity and usefulness, businesses have become increasingly reliant on the proper functioning of their computers and the networks which connect the computers. As such, a failure in any particular workstation or server may have a major impact on the productivity of a business.

Comprehensive systems management has traditionally provided bi-directional monitoring and control of servers, computers and the networks. Bi-directional monitoring allows for data and control to flow both from the network management system to the managed servers, computers and networks, and from the managed servers, computers and networks to the network management system. For example, the bi-directional monitoring and control of traditional comprehensive management systems allows the remote management system to take direct control of the servers, computers and networks at the monitored location. Traditional comprehensive systems monitoring software has been complex and expensive. The expense of traditional comprehensive systems management applications have limited their use to only the largest institutions. In addition, the bi-directional nature of traditional comprehensive systems management has introduced security issues which often require expensive and time-consuming solutions to fix. For example, the fact that managed computer systems may be controlled and modified by a remote management system leaves open the possibility that a malicious hacker or other intruder could take unauthorized control of the managed server, computer or network and damage the business using the managed server, computer or network by stealing information, changing data and erasing data.

SUMMARY OF THE INVENTION

From the foregoing, it may be appreciated that a need has arisen for a method and apparatus for acute systems monitoring.

According to the present invention, a method and apparatus are provided to address this need, and involve a monitoring system which includes a communications network and an agent unidirectionally coupled to the communications network and residing at a remote site. The agent is operable to monitor a set of operating parameters. The agent is further operable to generate an alert in response to an operating parameter exceeding a predetermined threshold and to transmit the alert across the communications network. The monitoring system further includes a listener coupled to the communications network and operable to receive the alert, and a responder operable to act in response to the alert.

BRIEF DESCRIPTION OF THE DRAWINGS

A better understanding of the present invention will be realized from the detailed description that follows, taken in conjunction with the accompanying drawings, in which:

FIGS. 6 and 6A is a flow diagram showing details of the generation and processing of an alert utilizing the present invention;

FIG. 7 is an exemplary flowchart showing details of the processing performed by the technical support service utilizing the present invention;

DETAILED DESCRIPTION OF THE INVENTION

Figure 1:
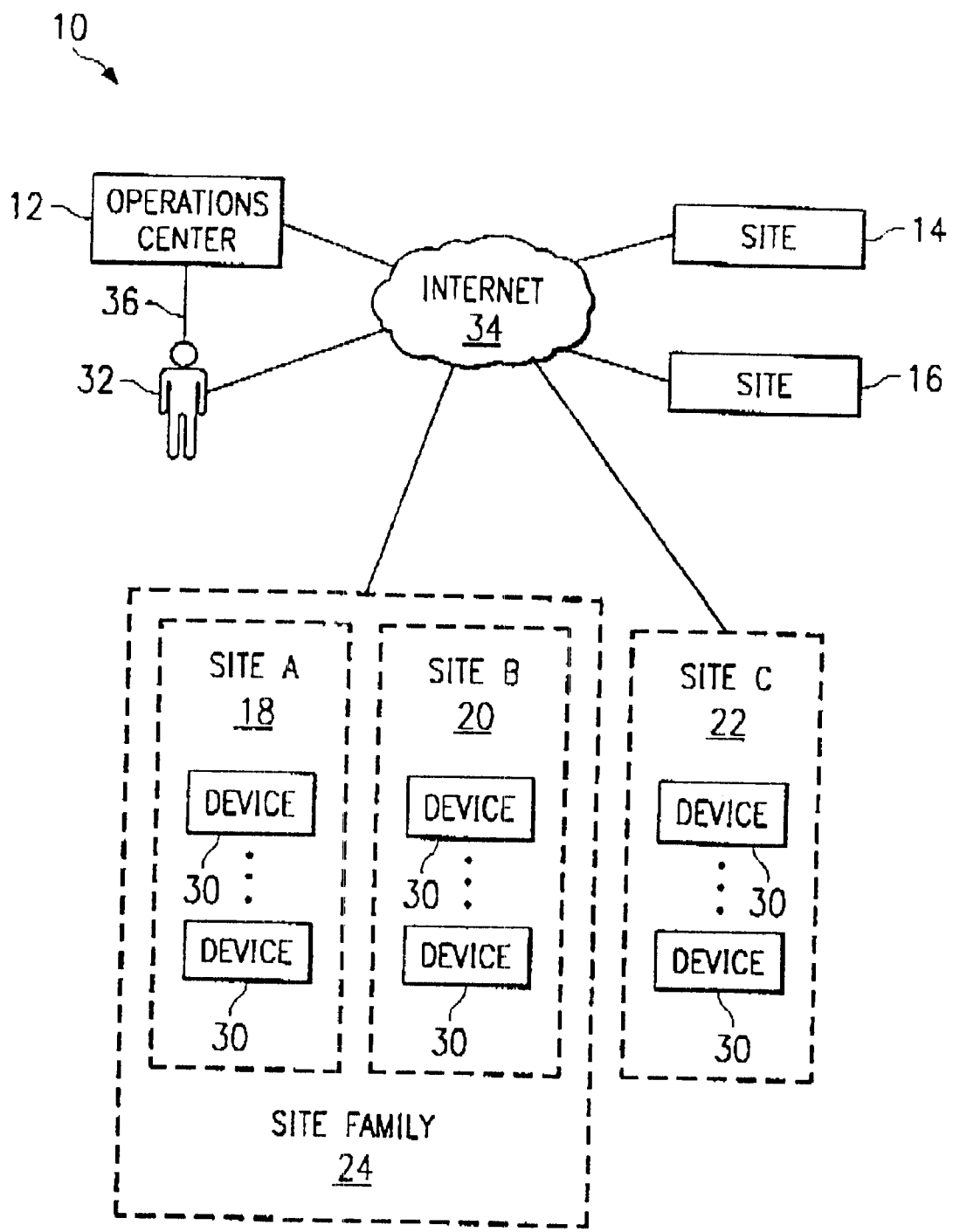
FIG. 1 is a block diagram showing an exemplary configuration of a remote device monitoring system utilizing the present invention.

FIG. 1 is a block diagram showing an exemplary configuration of an remote device monitoring system 10 utilizing the present invention.

Remote device monitoring system 10 may include an operations center 12, one or more sites 14, 16, 18, 20 and 22, one or more devices 30, and one or more responders or contacts 32. A communications network such as Internet 34 may be used to couple operations center 12, sites 14, 16, 18, 20 and 22, and contact 32. Contact 32 may further be connected to operations center 12 by some other communications link 36. Communications link 36 may be a pager, a phone, a fax machine, electronic mail or another suitable communications device.

Each site 14, 16, 18, 20 and 22 may include one or more devices 30. Hereinafter sites will be referred to generally as "site or sites 14" with the other reference numbers (16, 18, 20 and 22) being used to refer to particular sites. Sites 14 may represent physical and logical entities that have contracted with operations center 12 for monitoring services. Site 14 may be a company, a department within a company, a building, a geographic area, a logical entity occupying multiple geographic locations, or other suitable logical or physical entities capable of being monitored-over Internet 34 from operations center 12. The monitoring services provided by operations center 12 may include the monitoring of various operating parameters or predetermined status indicators (not shown) which indicate the present or predicted future health of devices 30 being monitored. The process for contracting for service will be described in more detail in association with FIG. 2.

Device 30 may be any of a plurality of electronic devices having simple or advanced data processing capabilities and health-indicative operating parameters that may be monitored by and communicated to a remote location, such as operations center 12. Each device 30 is associated with at least one site 14. For example, device 30 may be a server, a workstation, a personal computer, a laptop, a soft drink dispensing machine, a network postage machine, a printer, a personal digital assistant, a heating/ventilation/air conditioning (HVAC) system or another suitable device. Health-indicative operating parameters are status indicators which may be used to determine the current or predicted future operational status or health of device 30. The operating parameters, for example, may indicate that device 30 could cease operating in the near future, that device 30 is operating slower or less optimally than expected, that device 30 is more heavily loaded with processing requests than it should be, that the persistent storage associated with device 30 may be failing, and that device 30 is running out of supplies and inventory, such as cans of soft drink or a printer running out of ink and paper. Other status indicators associated with device 30 that may be utilized in the repair, debugging or monitoring of device 30 may also be used.

The operating parameters may vary based on the particular device 30 being monitored. For example, if device 30 being monitored is a network postage meter then the operating parameters may include the remaining postage available on the meter and whether the remaining postage has fallen below a particular level, whether the amount of ink is low, and whether the system is operational.

The health indicative operating parameters may vary based on the operating system and hardware used by device 30. Generally, the health indicative operating parameters may monitor the available disk space for a particular user, the number of failed log-in attempts for one or more users, the number of license connections currently available on the server and the network traffic load on the server.

For example, if device 30 utilizes the Windows 95/98 operating system, the health indicative operating parameters may include the available dynamic memory and whether it has fallen below a particular threshold, the processor utilization percentage and whether the utilization exceeds or drops below a particular threshold for a specific amount of time, system errors, general protection faults, system reboots, the relay of an event from a proprietary protocol, such as the Compaq Insight Manager, and the number of bad blocks on a hard drive. The health indicative operating parameters may further include the available memory, CPU utilization, available disk space, available system resources, available graphics device interface (GDI) resources, available user resources, whether the hard drives are on-line, and information regarding system start-up. The available memory may represent the percentage of total memory that is not being used, the CPU utilization may represent the percentage of time that the CPU is not idle, the available disk space may include the percentage of the total disk space that is not being used on each logical and physical hard drive on device 30, the available system resources may include the percentage of the total system resources that are not being used, the GDI resources may include the percentage of the total GDI resources that are not currently in use, and user resources may include the percentage of the total user resources that are not being used.

If device 30 is using the Windows NT operating system, then the health indicative operating parameters may include the available memory, the CPU utilization for each CPU, the available hard disk space, whether the hard drive is online, information regarding system start-up, event log alerts, application log alerts, Internet Information Service status, Structured Query Language service status and security log alerts. The logs may be monitored for particular alerts or information and generate alerts based on that information. The available memory may include the percentage of total memory, physical memory and virtual memory, either individually or as a group, that is not being used. The CPU utilization for each CPU may include the percentage of time each CPU is not in an idle state, and the available hard disk space may include the percentage of unused space on each logical and physical hard drive.

If device 30 is using the Novell Netware operating system, the health indicative operating parameters may include the available cache buffers, the CPU utilization, the available disk space, volume status, system start-up information, the number of purgable blocks on a volume, the forged pack count and a count,of invalid sequence numbers. The available cache buffers may include the percentage of the total cache buffers that are not being used, the CPU utilization may represent the percentage of time that the CPU is not idle, the available disk space may represent the percentage of unused space on each volume managed by the Novell Netware operating system, and the volume information may include whether a particular volume is on-line and operating.

Site family 24 groups a plurality of sites 18 and 20 so that these sites may be administered by a single administrator. The grouping of sites 18 and 20 into site family 24 does not preclude the sites 18 and 20 from having their own individual administrators. In one embodiment of the present invention, sites 18 and 20 in site family 24 are organized with site 18 as the parent site and site 20 organized as the child of the parent site. The administrator of the site which becomes the parent site becomes the administrator of site family 24.

Figure 2:
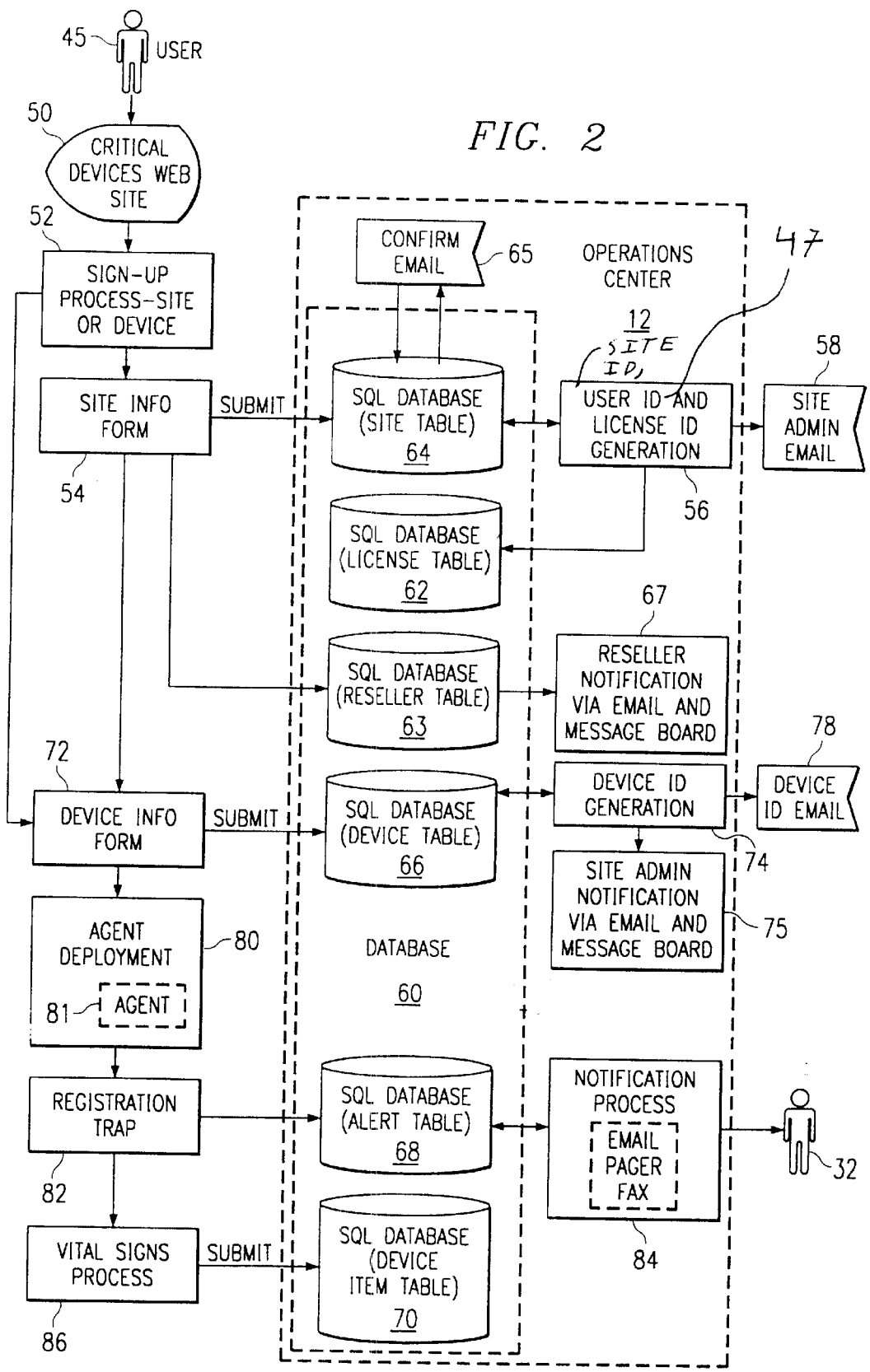
FIG. 2 is a flow diagram of a process for signing up with or contracting for a service with the remote device monitoring system utilizing the present invention.

Contact 32 represents one or more personnel who are contacted in order to respond to and repair problems associated with devices 30 monitored by remote device monitoring system 10. In the disclosed embodiment, contact 32 may be notified by any one or more means of communication such as electronic mail, a pager, a phone, or a fax, and may respond to operations center 12 that the notification has been received by, for example, posting a message on message board 93 (FIG. 2). This process is described in more detail in association with FIG. 2.

Internet 34 may be the Internet or any other suitable combination of local area networks, medium, and metropolitan area networks, wide area networks, intranets, and other wireless or wire-based communication links.

FIG. 2 is a flow diagram of a process for signing up with or contracting for service with remote device monitoring system 10. The sign-up process is initiated and performed by a user 45 in order to contract for monitoring service from remote device monitoring system 10. The user 45 is a human user of the present invention. The sign-up process is used to determine and allocate the number of licenses the user 45 will require, as well as acquire information from the user 45. In the disclosed embodiment, two types of licenses are available, a server license and a workstation license. The server license is required for each server the user 45 wishes to have monitored by system 10 and the workstation license is required for each workstation, PC or other non-server device that the user 45 wishes to be monitored. It should be noted that both servers and non-server devices may be devices 30. In the disclosed embodiment, the sign-up process is initiated by retrieving a web page 50 associated with remote device monitoring system 10 using a web browser (not shown). Web page 50 may comprise a plurality of web pages and may be stored on a web server (not shown) at operations center 12 or another suitable location. The sign-up process may be initiated in other ways, such as by a telephone call or electronic mail to operations center 12 or a service center (not shown), or by another suitable method by which the necessary information for server and workstation licenses may be obtained. Regardless of the contact method used, the sign-up process and the necessary information remain substantially similar.

At block 52, the user 45 requests, via web page 50, that the sign-up process begins. At block 54, web page 50 presents a site information form to user 45 which requires the user 45 to fill out specific information to register the user's site. Typically, the user 45 initiating or signing-up with remote device monitoring system 10 for a site is a site administrator 140 (FIG. 4) who has responsibility over the site. The site information requested by web page 50 may include:

General Information:
    Administrator First Name:\_\_\_\_\_
    Administrator Last Name:\_\_\_\_\_
    Site Name:\_\_\_\_\_
    Email Address:\_\_\_\_\_
    Address 1:\_\_\_\_\_
    Address 2:\_\_\_\_\_
    City:\_\_\_\_\_
    State:\_\_\_\_\_
    Zip:\_\_\_\_\_
    Phone:\_\_\_\_\_
    Fax:\_\_\_\_\_

Alert Contact Information:
    Alert Contact First Name:\_\_\_\_\_
    Alert Contact Last Name:\_\_\_\_\_
    Contact this person by: (Select One) Email, Pager
    Contact Phone Number or Email:\_\_\_\_\_

License Information:
    Reseller Name: (List of Authorized Resellers)
        License Count:\_\_\_\_\_(You must have at least one license)
        Workstations:\_\_\_\_\_
        Servers:\_\_\_\_\_

Reporting Information:
    Do you want to email an event log for this site?
    If so, how often?\_\_\_\_\_
    Email Address for Log:\_\_\_\_\_

The site information provided using web page 50 is then submitted by the user 45 to a database 60 in order to generate, at block 56, the license identifiers and the site identifier. The user 45 is informed of the generated site identifier and associated password at block 58 by an electronic mail message sent to the user 45. In particular, the electronic mail message is sent to the electronic mail address of the site administrator; however, the electronic mail message may be sent to any electronic mail address desired by the user 45. In the disclosed embodiment, the electronic mail address used is the electronic mail address entered for the site administrator in the site information. In addition, the licenses generated at block 56 are stored in a license table 62 which is part of the database 60. The site information is stored in a site table 64 portion of database 60. A confirmation electronic mail 65 having the site information therein may be sent to the user 45 so that the user 45 can confirm that the information stored in site table 64 is correct. In the disclosed embodiment, the electronic mail address used is the electronic mail address entered for the site administrator in the site information.

Creation of the site identifiers and license identifiers in block 56 may also trigger creation of a user identifier 47. If user 45 registering the new site already has an associated user identifier 47, then a new user identifier will not be created. If user 45 registering the new site has no associated user identifier 47, then a new user identifier 47 will be created.

User identifier 47 uniquely identifies each human user 45 associated with remote device monitoring system 10. User identifier 47 has an associated password, access set and may have other information, such as a user name and an office location, associated therewith. The password, access set and other information are stored in database 60. The access set defines the level of access to sites 14, site families 24 and devices 30 of the associated user 45. In particular, the access set defines the status of user 45 as a device administrator 100 (described in more detail in FIG. 3), the site administrator 140 (described in more detail in FIG. 4), a technical administrator 220 (described in more detail in FIG. 8) or a technician 221 (described in more detail in FIG. 8). Each user 45 may have one or more of the above statuses associated therewith. The access set is stored in database 60 and may define the user's 45 access by, for example, storing device identifiers and site identifiers associated with the devices 30 and sites 14, respectively, the user 45 is allowed to access. The access set may also associate the level of access permitted to the user 45 for each device and site identifier associated with the user 45 such as being site administrator 140 with full read and write access to all devices 30 associated with the site 14.

Resellers may also register new sites for clients of the reseller instead of people associated with the site signing-up directly with remote device monitoring system 10. Reseller table 63 stores information describing one or more resellers and allow the resellers to sign up devices 30 of customers of the reseller for monitoring service. A confirmation electronic mail 67 may also be sent to a reseller and posted on message board 93 following site and device registration. The confirmation electronic mail 67 includes all appropriate information so that a reseller may invoice or charge the user 45 for the monitoring service that the reseller is providing to the user. The reseller may be a business which resells the remote device monitoring service provided by operations center 12 to a particular user 45. For example, a reseller may purchase remote device monitoring services from Critical Devices, Inc., the assignee of the present application, and resell the service to a particular user 45. The reseller may invoice or charge the user 45 directly for the remote device monitoring services or may use a message board 93 to provide invoicing between operations center 12 and the user 45.

In one embodiment, only the reseller will invoice the user 45. The operations center 12 may request a reseller identifier as part of the site information in order to properly bill the reseller for the monitoring service. The reseller identifier also provides the reseller the ability to request licenses for sites 14 and devices 30 for the user 45.

Proceeding to block 72, after the user 45 has provided the user identifier 47 and password from block 56, the user 45 may receive a second web page having a device information form which the user may fill out for one or more devices 30 that the user wishes to have monitored by remote device monitoring system 10. Typically, the device information is provided by the user 45 with site administrator 140 or device administrator 100 access. Device administrator 100 is typically the user 45 of the particular device 30 being signed-up for monitoring, or someone who regularly uses that device 30. A license is required for each device 30 to be monitored. The device information form may request the following information:

General Information:
  Owner First Name:____
  Owner Last Name:____
  Machine Name:____
  Office Number:____
  Email Address:____
  Address 1:____
  Address 2:____
  City:____
  State:____
  Zip:____
Technical/Security Information:
  What is the operating system of the device?____
  How often would you like us to poll the device?
  Hours Available: From:____To:____
Reporting Information:
  Do you want us to email you an event log for this device?____
  If so, how often? Weekly, monthly, quarterly, never Email Address for Log:____

The completed device information form is then submitted to a device table 66 portion of database 60 and, at block 74, a device identifier is generated. The device identifier generated in block 74 is also stored in device table 66. At block 75 the device identifier is provided to user 45 who is identified as site administrator 140 of the site having the just registered device 30. The device identifier may be provided to site administrator 140 by electronic mail and message board 93.

The device identifier may then be sent to the user 45 who is device administrator 100 and the user 45 who is site administrator for the newly registered device 30, via electronic mail, in block 78 and displayed on the user's display (not shown). In the disclosed embodiment, the electronic mail is sent to user 45 who is identified as the device administrator 100.

Next, at block 80, an agent 81 is deployed to the device or devices 30 that the user 45 has registered for monitoring in block 72. In the disclosed embodiment, agent 81 is a file which is downloadable from a server via the file transfer protocol (FTP) or HTTP and is a C++ based operating system extension specific to a particular operating system, but may be an applet or application written in any suitable platform-independent programming language such as C, Java and Perl. Agent 81 may be installed on device 30 automatically or manually by the user 45 and performs the actual monitoring of device 30. In particular, agent 81 tracks the various operating parameters which are used to determine the current health of device 30 and generates alerts when device 30 may be experiencing problems. The operation of the agent is described in more detail below in association with FIG. 6.

After agent 81 is deployed to device 30, a registration trap 82 is performed by agent 81. Registration trap 82 is a test to ensure that communication between agent 81 on device 30 and operations center 12 is fully operational. In particular, registration trap 82 will generate a registration trap alert which is transmitted to operations center 12. The registration trap alert transmitted to operations center 12 includes the media access control (MAC) address of device 30. The combination of the MAC address and the device identifier associated with device 30 may be used by operations center 12 to ensure that the user has installed the agent on the particular device 30 for which the user has obtained the device identifier. When operations center 12 receives the registration trap alert it will be stored in an alert table 68 portion of database 60.

Then, at block 86, a vital signs process is performed by agent 81 on device 30. The vital signs process may be an optional process used to determine the present and predicted future health of device 30 with respect to factors other than those monitored by remote device monitoring system 10. For example, the vital signs process may be used to determine the year 2000 compliance of device 30. The information collected by the vital signs process may include the following:

Vital Signs for ANDREW

DeviceID 194

Oct. 6, 1999

SYSTEM INFORMATION:
  Windows 98 version 4.10 build 1998,
  GenuineIntel, Pentium (r) Processor, Intel MMX (TM) Technology
  EPP runtime BIOS—Version 1.1 Copyright (c) 1982, 1984 Compaq C, Feb. 26, 1998 ISA
  Total physical memory is 32 Megabytes.
  Total Space on drive c:\ is 2047 Megabytes
  Total Space on drive d:\ is 1850 Megabytes
PERFORMANCE:
  CPU Utilization: 67%
  Space on drive C: is 16% free.
  Space of drive D: is 96% free.
  Available Resources:
    Memory: 99%
    System: 79%
    User: 79%
    GDI: 86%
MULTIMEDIA DEVICES:
  Device: ES1878 Control Interface (WDM)
  Manufacturer: ESS Technology, Inc.
  Device: ES1878 Plug and Play AudioDrive (WDM)
  Manufacturer: ESS Technology, Inc.
  Device: Gamesport Joystick
  Manufacturer: Microsoft
  Device: Wave Device for Voice Modem
  Manufacturer: Compaq
  Device: Microsoft Kernel System Renderer
  Manufacturer: Microsoft
VIDEO CARDS:
  Device: Chips and Tech. 68554 PCI (COMPAQ)
  Manufacturer: Chips and Technologies, Inc.
  Revision: 162
MONITORS:
  Device: (Unknown Monitor)
  Manufacturer: (Standard monitor types)
INPUT DEVICES:
  Device: Standard 101/102-Key or Microsoft Natural Keyboard
  Manufacturer: (Standard keyboards)
  Device: Standard PS/2 Port Mouse
  Manufacturer: (Standard mouse types)

MODEMS:
　Device: Compaq Armada 1500 Series 560CL
　Manufacturer: Compaq
NETWORK ADAPTERS:
　Device: Infrared PnP Serial Port
　Manufacturer: (Infrared COM port or dongle)
　Device: Compaq Integrated NetFlex-3/P Controller
　Manufacturer: Compaq
　Revision: 016
NETWORK PROTOCOLS:
　Device: IPX 32-bit Protocol for the Novell NetWare Client
　Manufacturer: Novell
　Device: IPX/SPX-compatible Protocol
　Manufacturer: Microsoft
　Device: TCP/IP
　Manufacturer: Microsoft
　Device: Fast Infrared Protocol
　Manufacturer: Microsoft
NETWORK CLIENTS:
　Device: Novell NetWare Client
　Manufacturer: Novell
NETWORK SERVICES:
　Device: Microsoft SNMP agent
　Manufacturer: Microsoft
PCMCIA SOCKET DEVICES:
　Device: Texas Instruments PCI-1311 CardBus Controller
　Manufacturer: Texas Instruments
　Revision: 001
PORTS:
　Device: ECP Printer Port (LPT1)
　Manufacturer: (Standard port types) Device: Communications Port (COM1)
　Manufacturer: (Standard port types)
　Device: Infrared Serial (COM) Port
　Manufacturer: Microsoft
　Device: Infrared Printing (LPT) Port
　Manufacturer: Microsoft
STORAGE:
　Device: Standard Floppy Disk Controller
　Manufacturer: (Standard floppy disk controllers)
　Device: Opti Viper Max Dual PCI IDE Controller
　Manufacturer: Opti
　Revision: 048
　Device: Primary IDE controller (dual fifo)
　Manufacturer: (Standard hard disk drivers)
　Manufacturer: (Standard hard disk drivers)
　Device: MATSHITA UJDA120
　Manufacturer: MATSHITA
　Device: GENERIC IDE DISK TYPE65
　Manufacturer: GENERIC
　Device: GENERIC NEC FLOPPY DISK
　Manufacturer: GENERIC
PRINTERS:
　Device: HP LaserJet 5N
　Manufacturer: HP
　Device: IBM Proprinter
　Manufacturer: IBM
UNIVERSAL SERIAL BUS:
　Device: Compaq PCI to USB Open Host Controller
　Manufacturer: Compaq
　Revision 006
　Device: USB Root Hub
　Manufacturer: (Standard USB Host Controller)
SYSTEM DEVICES:
　Device: Plug and Play Software Device Enumerator
　Manufacturer: Microsoft
　Device: Plug and Play BIOS
　Manufacturer: (Standard system devices)
　Device: System board
　Manufacturer: (Standard system devices)
　Device: Advanced Power Management support
　Manufacturer: (Standard system devices)
　Device: System board extension for PnP BIOS
　Manufacturer: (Standard system devices)
　Device: Numeric data processor
　Manufacturer: (Standard system devices)
　Device: Programmable interrupt controller
　Manufacturer: (Standard system devices)
　Device: System timer
　Manufacturer: (Standard system devices)
　Device: Direct memory access controller
　Manufacturer: (Standard system devices)
　Device: System speaker
　Manufacturer: (Standard system devices)
　Device: System CMOS/real time clock
　Manufacturer: (Standard system devices)
　Manufacturer: (Standard system devices)
　Device: Motherboard resources
　Manufacturer: (Standard system devices)
　Device: IRQ Holder for PCI Steering
　Manufacturer: (Standard system devices)
　Device: Opti FireStar CPU to PCI bridge
　Manufacturer: Opti
　Revision: 050
　Device: Opti Firestar PCI to ISA Plug and Play bridge
　Manufacturer: Opti
　Revision: 049
　Device: IO read data port for ISA Plug and Play enumerator
　Manufacturer: (Standard system devices)
　Device: Composite Power Source
　Manufacturer: (Standard system devices)
　Device: APM Battery Slot
　Manufacturer: (Standard system devices)

The results of the vital signs process in block 86 may be submitted to operations center 12 to be stored in a device item table 70 portion of database 60. In the disclosed embodiment, the results of the vital signs process may be optionally submitted to operations center 12. The stored results of the vital signs process may be used to allow operations center 12 to assist administrators and users in tracking changes and updates to the hardware associated with device 30, for example, by generating a report of all the hardware changes to device 30.

Figure 3:
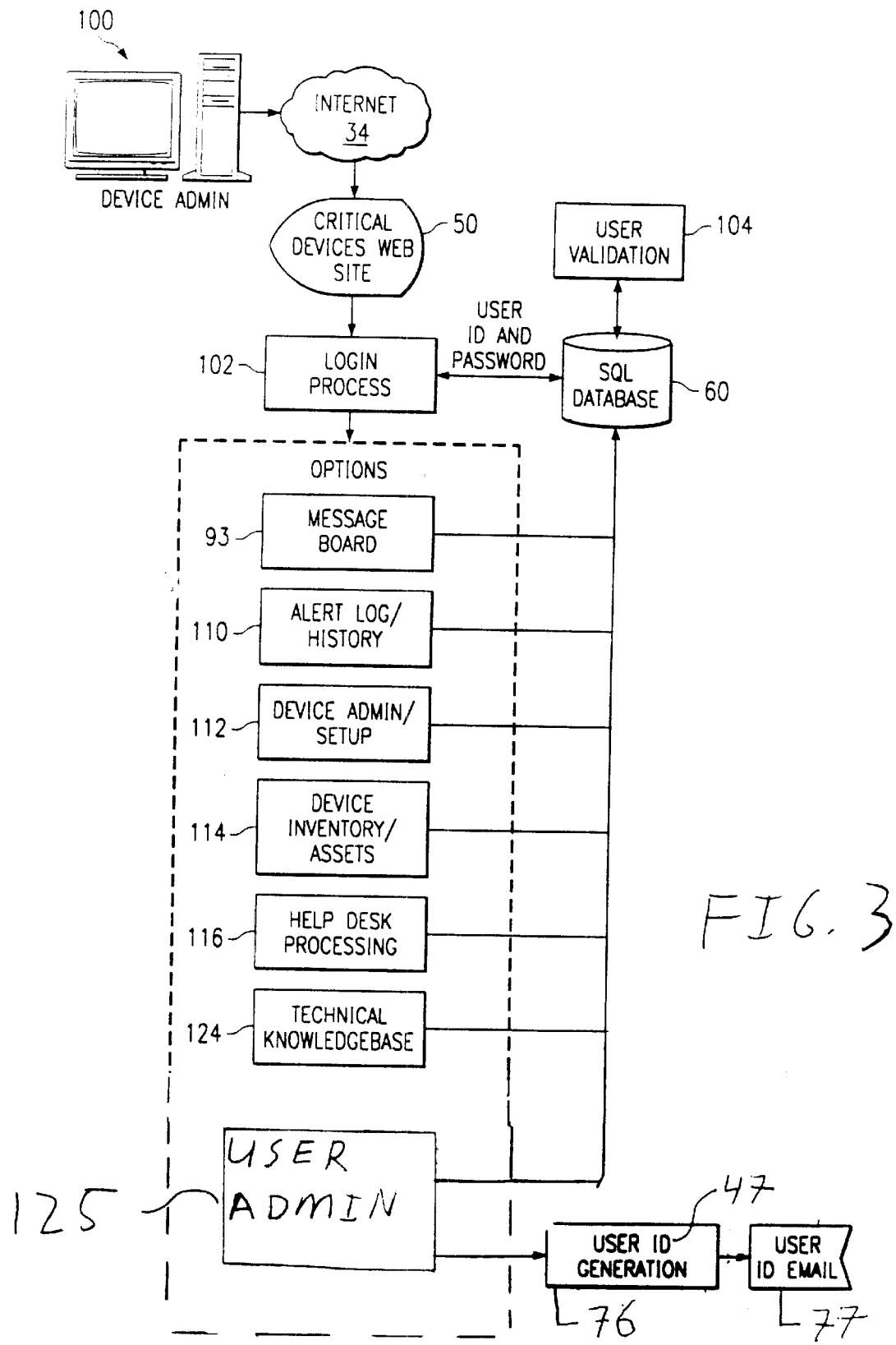
FIG. 3 is a flow diagram showing details of the processing and administrative functionality available to a device administrator utilizing the present invention.

FIG. 3 is a flow diagram showing a detail of the processing and administrative functionality available to device administrator 100. Device administrator 100 is responsible for administering one or more specific devices 30. Each device 30 may have one or more device administrators 100 associated therewith. Device administrator 100 communicates over Internet 34 to access website 50. In the disclosed embodiment, website 50 is a website comprising one or more web pages stored on a web server operated by Critical Devices, Inc., the assignee of the present invention. Website 50 may also be operated by other suitable entities who are capable of providing remote device monitoring service 10 according to the present invention. After device administrator 100 has contacted website 50, a login process 102 begins. User identifier 47 of device administrator 100 and the password associated with that user identifier 47 are supplied by device administrator 100. The user identifier 47 and password are then submitted to a user validator process 104.

User validator 104 is a process that accesses database 60 to validate the user identifier 47 and password. User validator 104 may use any suitable security technology to validate user identifier 47. For example, user identifier 47 and the associated password may be stored in database 60 and user validator may search database 60 for user identifier 47 and the password. If the user identifier 47 or password are invalid, then user validator 104 will return an error and device administrator 100 will be denied access to system 10. If user identifier 47 is valid, then device administrator 100 is logged into system 10.

Once device administrator 100 has logged in, device administrator 100 is presented with a plurality of options which may include viewing an alert log and history 110, performing device administration tasks 112 for device 30 which the device administrator 100 is the administrator, a process for viewing and modifying device inventory and assets 114, utilizing a technical support service 116, accessing a technical knowledge base 124, and performing user administration 125.

Alert log and history 110 provide device administrator 100 with a list of the current and past alerts that have been generated by agents 81 on respective devices 30 associated with device administrator 100. Device administrator 100 may also perform device administration tasks 112 which includes setup configuration and other functions associated with device 30. The device administration functions will vary based on the type of device 30 which the device administrator 100 administers. For example, a server device has different administration and setup options than a workstation or a network postage meter. Device inventory and assets process 114 may be used to view and modify the hardware list associated with device 30 and stored in database 60. In the disclosed embodiment, device inventory and assets process 114 stores the information in device item table 70 (FIG. 2).

Technical support service 116 allows device administrator 100 to submit a problem with device 30, the question regarding the operation of device 30, or other issues related to device 30 which the device administrator administers. Technical support service 116 is described in more detail in association with FIGS. 7 through 9. Technical support service 116 is one embodiment of a technical support system that may encompass an entire organization or site that may be in a single or in multiple geographic locations. The technical support system encompasses more than a group of people who wait and react to problems. The technical support system may provide services in addition to those of technical support service 116, such as full proactive and reactive technical support by utilizing the components described in association with technical support service 116 in FIGS. 7–9.

Device administrator 100 may also access message board 93. Message board 93 provides notification of system updates and upgrades and also provides a forum for any and all feedback, such as approvals and denials, required from device administrator 100, site administrator 140, or other users. Message board 93 may also be used by resellers in order to communicate and provide approvals and denials of invoices between operations center 12 and users.

Device administrator 100 may also access technical knowledge base 124 stored on database 60. Technical knowledge base 124 may contain information, technical bulletins, frequently asked questions, and other technical or training information that may be useful to device administrator 100. For example, technical knowledge base 124 may be accessed by device administrator 100 in order to solve a particular problem the device administrator 100 is experiencing with the device administrator's associated device 30.

Device administrator 100 may also perform user administration 125. User administration 125 includes adding, viewing and modifying the access set, the password and other information associated with user identifier 47. The other information may comprise a name of user 45 associated with user identifier 47, an office location of user 45 associated with user identifier 47, and any other suitable user 45 related information. Device administrator 100, in the disclosed embodiment, is limited to changing the password and other information associated with user identifier 47 of device administrator 100. A new user identifier 47 may also be generated at block 76 for user 45 of device 30. For example, the new user identifier 47 may be user 45 who will be device administrator 100 for one or more devices 30. At block 77, user 45 who has been associated with a new user identifier 47 may be notified of the new user identifier 47. User 45 may be notified via electronic mail and message board 93.

Figure 4:
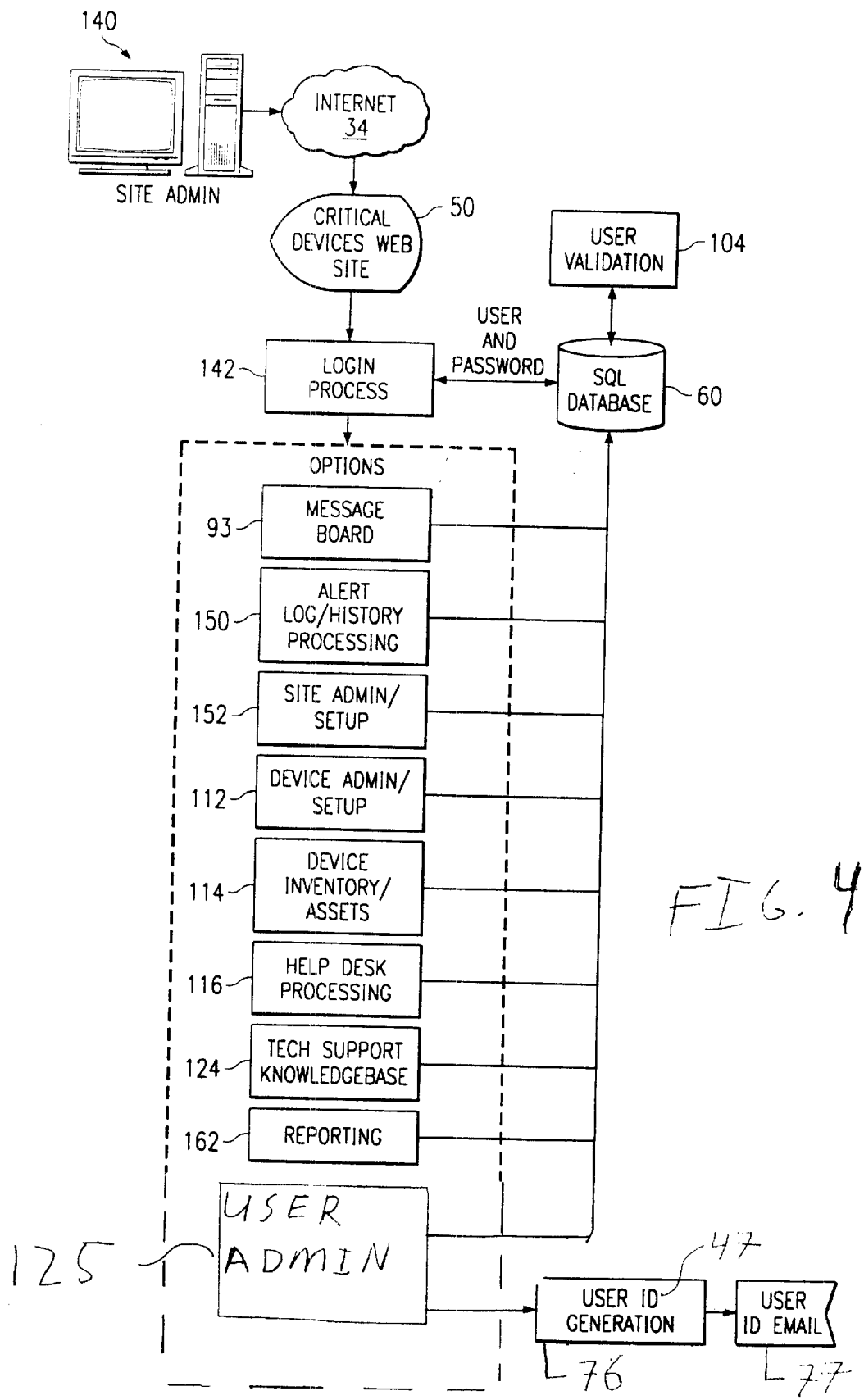
FIG. 4 is a flow diagram showing details of the processing of administrative functionality available to a site administrator according to the present invention.

FIG. 4 is a flow diagram showing details of the process and administrative functionality available to site administrator 140. Site administrator 140 may be responsible for one site 14 or multiple sites 14 in a site family 24. Site administrator 140 accesses website 50 over Internet 34. Website 50 is a website comprising one or more web pages stored on a web server operated by Critical Devices, Inc., the assignee of the present invention. Website 50 may also be operated by other suitable entities who are capable of providing remote device monitoring service 10 according to the present invention. Site administrator 140 logs into remote device monitoring system 10 by supplying user identifier 47 of site administrator 140 and the password associated with user identifier 47. The user identifier 47 and password are submitted to operations center 12 where they are validated against the user identifier 47 and password stored in database 60 using user validator 104. Once the security access of site administrator 140 has been verified, site administrator 140 is presented with a plurality of options which may include viewing site alert log and history 150, performing site administration 152, performing device administration 112, viewing and updating device inventory and assets 114, utilizing technical support service 116, accessing message board 93, utilizing technical support knowledge base 124, performing user administration 125, and generating reports 162.

Site alert log and history 150 allow Site administrator 140 to view and modify alerts generated with respect to any devices 30 associated with site 14. Site administrator 140 may also perform site administration tasks 152, such as adding or removing devices 30 from site 14 and requesting more or fewer licenses for devices 30 at site 14 in order to accommodate equipment changes at site 14. Site administrator 140 may also be responsible for administering site family 24, for example, by adding and removing sites 14 and devices 30 from site family 24. Site administrator 140 also has access to device inventory and assets 114 for every device 30 in site 14 which site administrator 140 administers and has access to functionality similar to that of device administrator 100. Site administrator 140 also has access to technical support service 116. Site administrator 140 may also access technical support knowledge base 124.

In addition, site administrator 140 may request and generate reports 162. Site administrator 140 may generate reports 162 incorporating any of the information available to site family 140 as part of the site alert log and history 150, the performance of site administration 152 and device administration 112, and the device inventory and assets 114. Reports 162 may be customized by site administrator 140 to incorporate any or all of the information available to site administrator 140.

Site administrator 140 may also perform user administration 125. site administrator 140 may freely add and delete user identifiers 47 and modify existing user identifiers 47. Site administrator may change any of the access set, passwords and other information associated with any user identifier 47 associated with site 14 which site administrator 125 administers.

Figure 5:
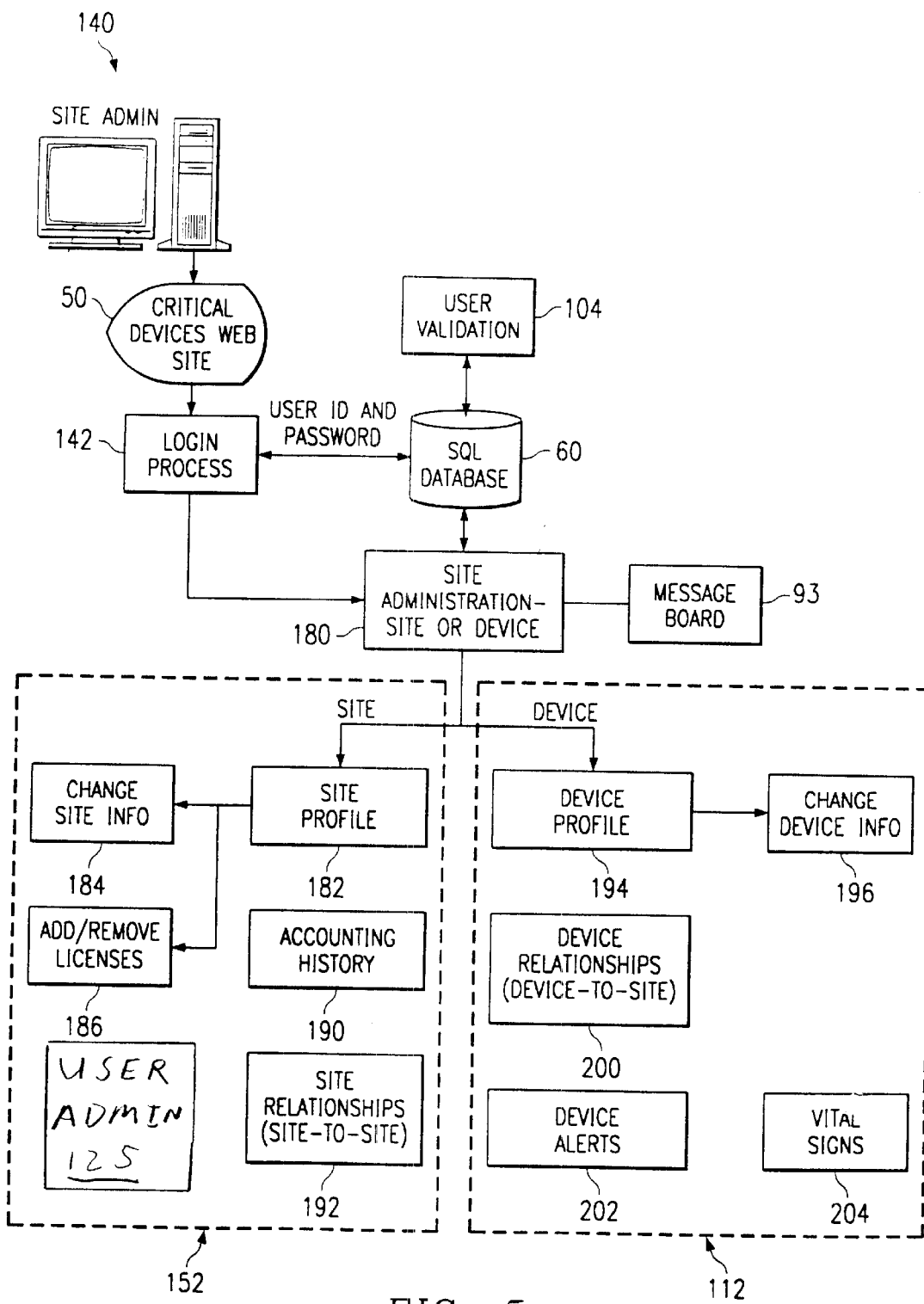
FIG. 5 is a flow diagram showing details of site and device administration processes of the present invention.

FIG. 5 is a flow diagram showing details of the site and device administration process of the present invention. Site administrator 140 accesses website 50 and begins login process 142 in order to log in as the site administrator. Login process 142 passes the user identifier 47 and password of site administrator 140 to database 60 at operations center 12 for validation. The user identifier 47 and password are validated by user validator 104. Once site administrator 140 has been validated, site administrator 140 is allowed to log in. At block 180 site administrator 140 may choose to perform site administration tasks 152 for site 14 or device administration tasks 112 for any of devices 30 in site 14 administered by site administrator 140.

In particular, if site administrator 140 chooses to perform site administration tasks 152, then site administrator 140 may perform user administration 125, change the site profile at block 182, examine an accounting history 190, and view and modify site-to-site relationships in block 192. Changing the site profile at block 182 may include changing the site information at block 184, adding licenses at block 186, or changing the passwords associated with devices 30 associated with site 14 or changing the site password itself at block 188. In the disclosed embodiment, changing the site information at block 184 includes changing the site information submitted in block 54 and stored in the site table 64 (FIG. 2). At block 186, site administrator 140 may add or remove licenses for devices 30 associated with site 14 which site administrator 140 administers. Site administrator 140 may also change site or device passwords at block 188 for sites 14 and devices 30 which site administrator 140 administers. Site administrator 140 may also view accounting history 190 which provides a breakdown of the various charges that have been assessed by operations center 12 with respect to site 14 or site family 24 which site administrator 140 administers. Site administrator 140 may also modify site-to-site relationships 192, for example, by removing sites 14 from site family 24.

Site administrator 140 may also perform device administration 112 on any device 30 associated with site 14 which site administrator 140 administers. In particular, site administrator 140 may change the device profile at block 194 or device-to-site relationships at block 200. Changing device profile 194 may include changing the device information at block 196 which involves changing the device information submitted as part of the device information form at block 72 and the information in device table 66 (FIG. 2). Site administrator 140 may also change the device-to-site relationships at block 200 by, for example, moving a particular device 30 from one site 18 in site family 24 to another site 20 in site family 24. Site administrator 140 may also access and administer message board 93.

FIG. 6 is a flow diagram showing details of the generation and processing of an alert for device 30. Agent 81 associated with device 30 operates to monitor various health-indicative operating parameters associated with each device 30. The operation of agent 81 is described in more detail in FIG. 6A. When one of the health-indicative parameters exceeds a predetermined threshold or value indicative of poor health, or indicating a high likelihood of poor health or failure, agent 81 generates an alert in block 360. The alert includes the device identifier and MAC address of device 30 which is generating the alert. The alert also includes version information associated with agent 81 so that operations center 12 may notify the user that a new version of agent 81 is available. The alert is then unidirectionally transmitted over Internet 34 by agent 81 to a listening process 362. In particular, agent 81 is operable only to transmit information outbound from the device 30 and provides no support for receiving inbound information or connections. By allowing agent 81 to only transmit outbound information, greater security is maintained for device 30 and site 14 as no additional entry points are provided for exploitation by hackers and intruders.

Listening process 362, in the disclosed embodiment, is located at operations center 12 and operates to receive alerts generated by any of the plurality of deployed agents 81. Listening process 362 may also receive alerts generated by third-party agents other than agent 81 and may do so by defining a Simple Network Management Protocol (SNMP) Management Information Base (MIB) for the third-party agent. Listening process 362 may be a multi-threaded program that process the data contained in the alert.

Listening process 362 will verify device identifier and MAC address information in the received alert against stored device identifiers and MAC addresses in database 60. Listening process 362 verifies the device identifier and MAC address in the alert to ensure that the alert is from a valid and active device 30. If the device identifier and MAC addresses are not found in database 60 or are inactive, then listening process 362 will discard the alert.

In particular, listening process 362 may format the data into an appropriate text string that may be passed to notification process 84 for further processing. In particular, listening process 362 stores the alert in database 60 in a pending notifications table (not shown) which notification process 84 continually polls for work to do. Notification process 84 queries database 60 based on the received alert so that device 30 from which the alert has been received may be validated, retrieves the required information for notification of contact 32 and records the received alert in database 60. In particular, the device identifier associated with device 30 and the license identifier associated with device 30 from which the alert is received are validated by a device validator 106 and a license validator 108.

Device validator 106 validates the device identifier supplied with the alert. Device validator 106 validates the device identifier by finding the device identifier in device table 66. If the device identifier is found in device table 66 and the device identifier is not inactive for some reason, such as being behind on paying for the monitoring service, device validator 106 will report that the device identifier is valid and allow the alert to be processed by license validator 108. If the device identifier is not found in device table 66, for example, if the device identifier is a false or fraudulent device identifier, then the device validator 106 will abort the processing of the alert by operations center 12.

License validator 108 validates the license identifier supplied with the alert. License validator 108 validates the license identifier by finding the device identifier in license table 62. If the license identifier is found in license table 62 and the license identifier is not inactive for some reason, such as being behind on paying for the monitoring service, license validator 108 will report that the license identifier is valid and allow the alert to be processed by notification process 84. If the license identifier is not found in license table 62, for example, if the license identifier is a false or fraudulent license identifier, then the license validator 108 will abort the processing of the alert by operations center 12.

In addition, notification process 84 retrieves any required information associated with the alert at block 362 from the database 60 and updates alert table 68, as shown in block 364. Once notification process 84 has retrieved information from block 362, validated the device identifier and license identifiers and processed the alert, the notification process 84 notifies contact 32 of the alert. Notification process 84 may use, in the disclosed embodiment, electronic mail, a phone, a pager, or a fax to notify contact 32. For example, if notification process 84 is using electronic mail or a fax, notification process 84 may send a detailed description of device 30 for which the alert has been generated and if notification process 84 is using a pager to notify contact 32, notification process 84 may send a page using a particular identifying number followed by the device identifier of device 30 and a numeric value representing the alert. Contact 32 may then handle the alert by taking appropriate actions in response to the alert.

FIG. 6A is a flow chart showing the operation of the agent. Agent 81, in one embodiment, may use the SNMP network management protocol which is well-known in the industry. At block 400, the SNMP service is loaded by the operating system. In block 402, the SNMP service loads agent 81 into the memory of device 30 for execution.

At block 404, agent 81 performs set up and initialization procedures such as allocating needed memory and initializing variables. At block 406, agent 81 loads current values for all indicators, such as the health indicative operating parameters previously described, into MIB variables for use with SNMP.

At block 408, agent 81 performs blocks 410, 412, 414, and 416 for each health indicative operating parameter. At block 410, the current operating parameter is examined to determine its current value on device 30 and is compared to a threshold value. The SNMP alerts may be transmitted to operations center 12 using the universal datagram protocol (UDP). At block 412, an alert is generated if the current value of the current operating parameter is; outside the threshold values or other values within which the current operating parameter is expected to operate. If the current operating parameter is outside of its allowed operational range, then the YES path of decisional step 412 is followed and an SNMP alert is created for the current operating parameter in block 414. The SNMP alert may include an SNMP variable binding list containing the appropriate MIB variables associated with the operating parameter, the MAC address of device 30 and the device identifier associated with device 30. If the current operating parameter has not exceeded its allowed operational range, then the NO branch of decisional step 412 will be followed to block 416. At block 416, the next operational parameter is set as the current operational parameter and the method returns to block 410.

Once each operating parameter has been examined in block 408, the method proceeds to decisional step 418. At decisional step 418, a check is made to see if any SNMP traps have been created in block 414. If any traps have been generated, then the YES branch of decisional step 418 is followed to block 420 where the generated traps are treated as alerts and sent to operations center 12. If no traps have been generated in block 414, then the NO branch of decisional step 418 is followed to block 422. At block 422, agent 81 may sleep for a predetermined period of time, such as five seconds, and then continue to step 406 to again check the current values of each operating parameter on device 30. The method proceeds until agent 81 is terminated, such as at system shutdown.

FIG. 7 is an exemplary flow chart of the processing performed by the technical support service. When site administrator 140 or device administrator 100 accesses technical support service option 116, the technical support service 116 will begin processing at step 250 by requesting specific information from the user. The users of technical support service 116 may include site administrator 140, device administrator 100 or other users. For example, technical support service 116 may request following information:

Category:
   Hardware
   Software
   Communications
   Other
Action:
   Install
   Upgrade
   Replace
   Repair
   Performance
   Other
Component: Drop Down list with possible components. Typically, these should be relevant for the Category selected above.
Severity: (1 to 5 with 1 the most severe)
Issue Description:
Is this preventing you from completing your daily responsibilities? (Y/N)

Any other suitable information may be requested from the user in order to more effectively provide help or support to the user with respect to their problem. Then, at step 252, the technical support service creates an open issue with the user's information and enters the newly created open issue in an open issue list, queue or record 254. When a problem is in the open issue list 254, the attention of a support technician or other designated personnel is required, as shown in block 253. The support technician (not shown) may enter, add, modify, update or delete one or more action items and status information associated with each respective open issue in open issue list 254. The action items and status information may include, for example, equipment that has been ordered in order to complete repairs and an expected arrival date, percentage completion of the open issue, actions taken in order to resolve the open issue and any other suitable information relating to the open issue. The support technician may also generate a trouble ticket 256 for any open issue. In the disclosed embodiment, the trouble ticket may be a hardcopy version of the status information and action items, and may include other information related to the open issue. After the support technician believes an open issue to be resolved, the open issue is transferred to a work-in-progress list 255 at block 257. The user or device administrator 100 is notified that the open issue has been transferred to the work-in-progress list 255. In the disclosed embodiment, the user or device administrator 100 may be notified by any suitable method such as by an electronic mail, a phone call, a fax or a pager. Once the open issue has been transferred to the work-in-progress list 255, the open issue must be approved by the user or device administrator 100 of that device 30 before the open issue may be closed.

In decisional block 258, the user may indicate approval or disapproval of closing the matter. In the disclosed embodiment, the user's approval is based on the resolution of the issue by the support technician. If the user approves of the resolution of the problem by the support technician, the issue is, as shown in block 260, marked as closed and moved to a closed issue list 259. Closed issue list 259 may contain all of the action items and status information associated with the open issue as well as any comments made by the user during the approval process. If the user does not agree that the issue has been resolved by the support technician, the user may disapprove closing the issue, and the issue is moved from work-in-progress list 255 back to open issue list 254 so that the support technician can continue addressing the problem. It may be seen that any matter will not reach a conclusion until the user is satisfied with the manner in which the problem is resolved.

Figure 8:
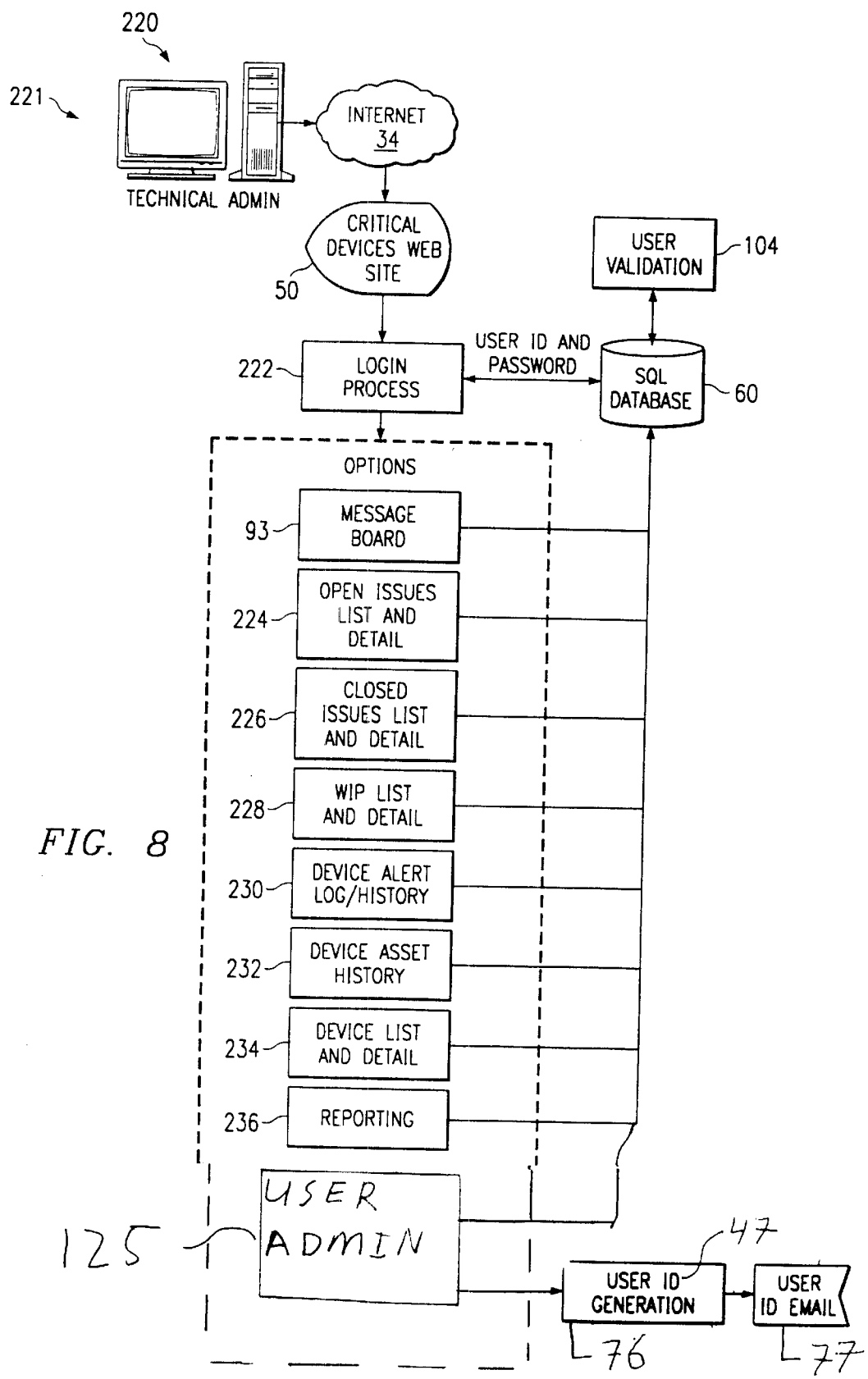
FIG. 8 is a flow diagram showing details of the resolution of an open issue and an open issue list utilizing the present invention.

FIG. 8 is a flow diagram showing details of the resolution of an open issue in the open issue list. Technical administrator 220 and technician 221 may connect to website 50 over Internet 34. Technical administrator 220 logs in at block 222 by providing the technical administrator's user identifier 47 and password. The user identifier 47 of technical administrator 220 will then be validated by user validator 104. Once technical administrator 220 has been validated, technical administrator 220 will be allowed to log in and may be presented with a plurality of options. The options include accessing open issue list 224, accessing the message board 93, closed issue list 226, work-in-progress list 228, a device alert log and history 230, a device asset history 232, a device list 234 with associated details, and a report generator 236.

Technical administrator 220 may view any of the open issues in open issue list 224, and view and update details and information associated with each open issue. In the disclosed embodiment, technical administrator 220 updates a selected open issue with action items and status information regarding the resolution of the selected open issue. Technical administrator 220 may also view closed issue list 226 and any details associated with the closed issues, such as user comments regarding the resolution of the open issue when the user approved the open issue for closing. Work-in-progress list 228 and associated details provide technical administrator 220 with information regarding which open issues have been resolved by technical administrator 220, by other technical administrators, or by technical support personnel, that are awaiting user approval. Device alert log and history 230 provides a list of current and past alerts generated by each device 30 which has an open issue associated with it. Similarly, device asset history 232 will list hardware changes and information associated with each device 30 which has an open issue associated with it. The device alert log and history 230 and device asset history 232 may be used by technical administrator 220 in order to more efficiently resolve the open issue. Device list 234 and associated details provide the technical administrator with a list of all devices having open issues in the open issue list. Technical administrator 220 may also generate a variety of reports using report generator 236. The reports may include, for example, any of the information available to the technical administrator such as that in open issue list 224, closed issue list 226, work-in-progress list 228, device alert log and history 230, device asset history 232 and device list 234.

Technical administrator 220 may assign one or more technicians 221 to work on any of the open issues in open issue list 224 and work-in-progress list 228, and closed issues in closed issue list 226. Technicians 221 are similar to technical administrators 220, but are limited in their access to open issue list 224, closed issue list 226, work-in-progress list 228, device alert log and history 230, device asset history 232 and device list 234. Specifically, technicians 221 may only access open issues and closed issues that have been assigned to them by technical administrator and have read-only access to device alert log and history 230, device asset history 232 and device list 234. Technicians 221 may alternatively have more limited access and may have read-only access to open and closed issues which are assigned to technician 221 and vital signs of device 30 associated with the open and closed issues.

Figure 9:
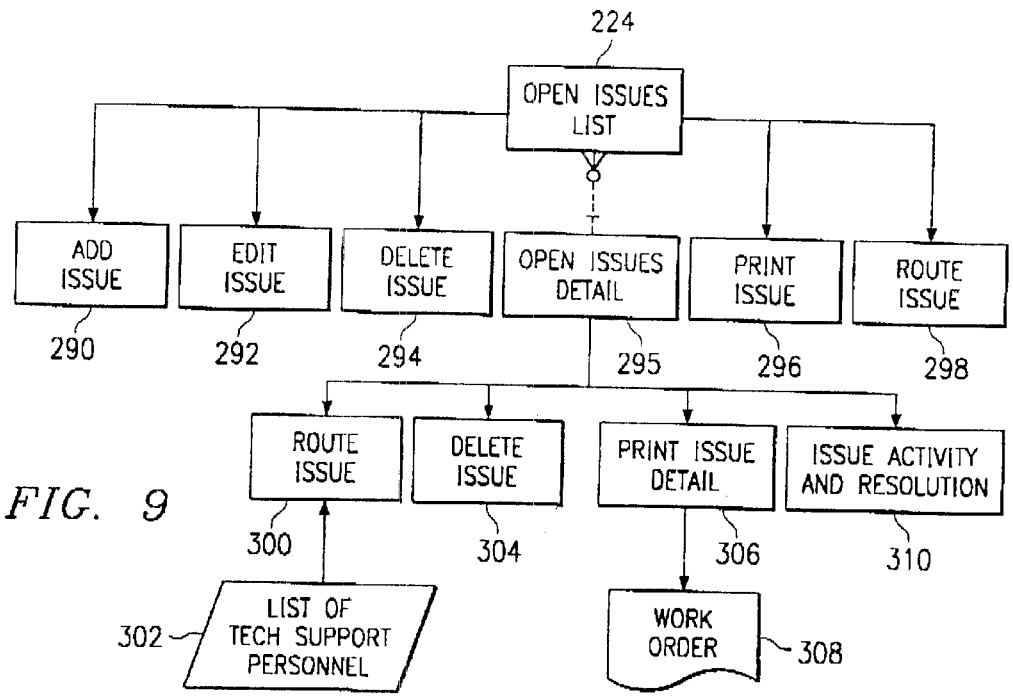
FIG. 9 is a flow diagram showing details of functionality associated with an open issue list utilizing the present invention.

FIG. 9 is a flow diagram showing details of functionality associated with open issue list 224. Open issue list 224 includes an add issue functionality 290, an edit issue functionality 292, a delete issue functionality 294, a print issue functionality 296, and an issue routing functionality 298. Access to certain details 295 associated with the open issue list 224 is also provided. Issue routing functionality 298 further allows technical administrator 220 to route the open issue to appropriate support personnel.

Open issue details functionality 295 includes issue routing information 300, issue delete functionality 304, print detail functionality 306, and issue activity and resolution status 310. Issue routing information 300 may utilize a list of technical support personnel 302 in order to provide and track the recipient of an open issue routed to the recipient by technical administrator 220. Print detail functionality 306 may be used to generate a detailed work order 308 which, in the disclosed embodiment, is a hard copy with includes the open issue and the details associated with the open issue. Issue activity and resolution information 310 may include status information and action items related to the resolution of the open issue by technical administrator 220 or by support personnel.

Figure 10:
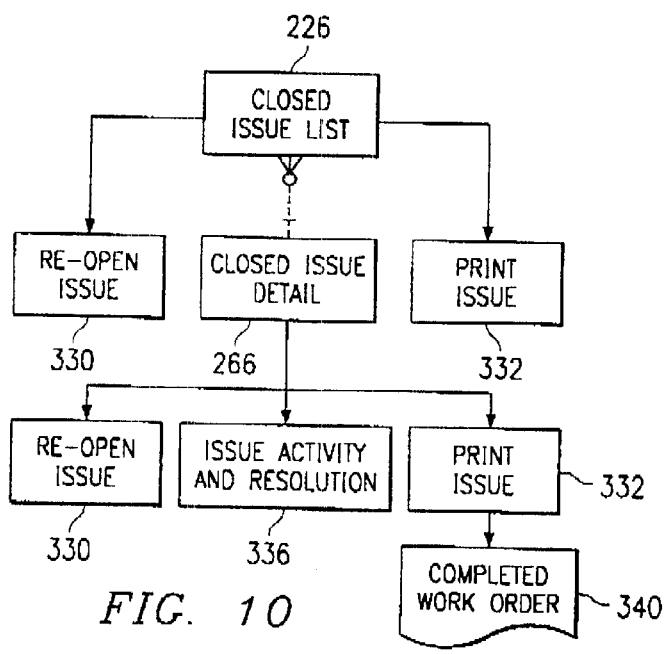
FIG. 10 is a flow diagram showing details of functionality associated with a closed issue list utilizing the present invention.

FIG. 10 is a flow diagram showing details of functionality associated with the closed issue list. The closed issue list functionality includes reopen issue functionality 330, print closed issue functionality 332, and closed issue details 266. Reopen issue functionality 333 provides technical administrator 220 the ability to remove a selected open issue from work-in-progress list 228 and place it back in open issue list 224 or move the selected open issue to the closed issue list. Print issue functionality 332 allows technical administrator 220 to print a closed issue and information in closed issue detail 266 to a hard copy. Print issue functionality 332 also allows technical administrator 220 to generate a completed work order 340. In the disclosed embodiment, completed work order 340 is a hard copy representation of the closed issue and closed issue detail 266.

Closed issue detail 266 includes the reopen issue functionality 330, issue activity and resolution functionality 336, and print issue functionality 332. Issue activity and resolution information 336 may include action items and status information regarding the resolution of the closed issue. In addition, issue activity and resolution information 336 may include user comments provided in association with the approval of the closing of the open issue by the user as described in FIG. 7.

The present invention provides a number of technical advantages. One such technical advantage is the capability for unidirectional monitoring of the health of a device. The unidirectional monitoring allows for the use of unsecured communications links, such as the Internet, between the monitored device and an operations center. Unidirectional monitoring avoids the requirement for installing and maintaining expensive secure communications lines. An agent deployed to devices at a site is operable only to transmit information from the device to the operations center which prevents the use of the agent by intruders and hackers to gain access to the site. A further technical advantage is the capability of the present invention to provide remote and scalable monitoring of the health of devices inexpensively. Small and medium sized businesses may now take advantage of the service with minimal cost compared to traditional comprehensive system management.

Although one embodiment has been illustrated and described in detail, it should be understood that various substitutions and alterations can be made therein without departing from the scope of the present invention. For example, although the operations center is described as a single location, it could encompass several locations, for example, to serve different geographic areas.

It should also be recognized that direct connections disclosed herein could be altered, such that two disclosed components or elements would be coupled to one another through an intermediate device or devices without being directly connected, while still realizing the present invention. Other changes, substitutions and alterations are also possible without departing from the spirit and scope of the present invention, as defined by the following claims.

What is claimed is:

1. A monitoring system comprising:

an agent unidirectionally coupled to a communications network and residing at a remote site, the agent operable to monitor a set of operating parameters and to generate an alert in response to an operating parameter exceeding a predetermined threshold and transmit the alert across the communications network;

wherein the agent is further operable to generate a registration trap when deployed at a device associated with the site;

a listener coupled to the communications network and operable to receive the alert; and a responder operable to act in response to the alert.

2. The monitoring system according to claim 1 further comprising an operations center coupled to the communications network and operable to receive the alert from the listener and to notify the responder in response to the alert;

wherein the registration trap includes a hardware address associated with the device; and wherein the agent is further operable to transmit the registration trap to the operations center.

3. The monitoring system according to claim 2, wherein the operations center further comprises:

a database operable to store a plurality of license information, a plurality of site information, a plurality of device information, a plurality of user information, a plurality of alert information and a plurality of inventory information; and a web site operable to provide sign-up and login abilities.

4. The monitoring system according to claim 1, wherein the operating parameters comprise:

an available hard disk storage space indicator; and a hard disk media error indicator.

5. The monitoring system according to claim 1, wherein the operating parameters comprise:

an available memory indicator; and an available system resources indicator.

6. The monitoring system according to claim 1, wherein the operating parameters comprise:

a processor utilization level indicator; and a system error indicator.

7. The monitoring system according to claim 1, wherein the unidirectional coupling of the agent provides only data transmission capabilities outbound from the agent to the communications network.

8. The monitoring system according to claim 1, wherein the site includes a site identifier and a site administrator associated therewith.

9. The monitoring system according to claim 8, wherein the site includes a device, the device having a device identifier associated therewith.

10. The monitoring system according to claim 8, wherein the site includes a plurality of devices, each device having a device identifier associated therewith.

11. The monitoring system according to claim 10, wherein each device further has a respective device administrator associated therewith.

12. The monitoring system according to claim 11, wherein the responder and the device administrator are both human personnel.

13. The monitoring system according to claim 1, wherein the communications network is the Internet.

14. The monitoring system according to claim 2 further comprising a predetermined communications channel used by the operations center to notify the responder.

15. The monitoring system according to claim 14, wherein the predetermined communications channel is selected from the group consisting of electronic mail, a pager, a facsimile and a phone call.

16. The monitoring system according to claim 1, wherein the agent is a platform-specific software program.

17. The monitoring system according to claim 1, wherein the agent is an operating system extension.

18. The monitoring system according to claim 1 further including a site family having a plurality of sites therein and operable to be administered by a site administrator, the site administrator being operable to administer each of the sites in the site family.

19. The monitoring system according to claim 18, wherein the sites in the site family include a parent site and at least one child site, each of the parent site and the child sites being selected from the sites in the site family, and wherein the site administrator responsible for administering the site family is the site administrator of the parent site.

20. A method for remote monitoring comprising the steps of:

deploying a monitoring agent at a site;

generating, by the monitoring agent, a registration trap at the device;

monitoring the site for a change in a set of predetermined status indicators associated with the site;

generating an alert in response to a change in any of the status indicators;

unidirectionally communicating the alert over a communications link to an operations center; and notifying a technical respondent in response to the alert.

21. The method for remote monitoring according to claim 20 further comprising the steps of:

contracting with the operations center to monitor at least one site of an organization;

deploying the monitoring agent at the at least one site, each site including at least one device;

monitoring the at least one device at each site for any changes in the set of predetermined status indicators, wherein the status indicators comprise an available hard disk storage space indicator, a hard disk media error indicator, an available memory indicator, an available system resources indicator, a processor utilization level indicator, and a system error indicator;

generating the alert such that the alert is related to the changed status indicator; and notifying a technical respondent associated with the site causing the alert.

22. The method for remote monitoring according to claim 20, wherein the registration trap includes a hardware address associated with the device and deploying the monitoring agent comprises:

transmitting the monitoring agent from an operations center to the site, wherein the monitoring agent provides only unidirectional communications capabilities and the unidirectional communications capabilities allow only outbound transmission of information from the site;

installing the monitoring agent on a device at the site; and transmitting the registration trap to the operations center.

23. The method for remote monitoring according to claim 20 further comprising:

receiving the alert by a listener at the operations center;

validating a device identifier and license identifier associated with the alert at the operations center;

querying a database based on the alert;

adding the alert to an event table; and dispatching the alert to a notifier.

24. The method for remote monitoring according to claim 20, wherein the unidirectionally communicating the alert step only allows transmission from the site to the operations center.

25. The method for remote monitoring according to claim 21, wherein the contracting step comprises:

providing, by a user associated with the organization, to the operations center of site information, the site information identifying a technical administrator, a site administrator, and at least one device administrator;

requesting, by the user, at least one license from the operations center;

allocating the at least one license to the organization.

26. The method for remote monitoring according to claim 25, wherein the requesting the at least one license step comprises:

requesting at least one server license; and wherein the allocating the at least one license step comprises:

creating a site identifier for each site associated with the organization;

creating a user identifier for each site associated with the organization;

associating the user identifier with the site administrator;

sending a device registration notification to the site administrator associated with each device for which a respective one of the at least one device licenses has been requested;

sending the device information of the device to the operations center; and generating a device identifier associated with the device, the device identifier being generated as a function of the device information.

27. The method for remote monitoring according to claim 26, wherein the requesting the at least one license step further comprises requesting at least one server license.

28. The method for remote monitoring according to claim 20 further comprising:

providing a web site at the operations center;

logging into the web site, by a device administrator, using a user identifier associated with the device administrator;

verifying the user identifier at the operations center; and providing a plurality of options to the device administrator.

29. The method for remote monitoring according to claim 28, wherein providing the plurality of options step comprises:

viewing a device alert log;

performing device administration;

viewing a device inventory;

performing user administration;

utilizing a technical support service; and utilizing a technical knowledgebase.

30. The method for remote monitoring according to claim 20 further comprising:

providing a web site at the operations center;

logging into the web site, by a site administrator, using a user identifier associated with the site administrator;

verifying the user identifier at the operations center; and providing a plurality of options to the site administrator.

31. The method for remote monitoring according to claim 28, wherein providing the plurality of options step comprises:

viewing a site alert log which includes a plurality of alerts associated with the site and a plurality of alerts associated with the device associated with the site;

performing site administration;

performing device administration;

viewing a device inventory;

performing user administration;

utilizing a technical support service; and utilizing a technical knowledgebase.

* * * * *